US011858012B2

(12) United States Patent
Barrios et al.

(10) Patent No.: US 11,858,012 B2
(45) **Date of Patent: *Jan. 2, 2024**

(54) CLEANROOM WIPER AND METHOD FOR MAKING SAME

(71) Applicant: Foamtec International Co., Ltd., Waco, TX (US)

(72) Inventors: Jayson Barrios, Aubrey, TX (US); Armand Barrios, Chandler, AZ (US); Fred Pisacane, San Diego, CA (US); Eddy Thng, Singapore (SG); Chavala Chaovanalert, Kahao Yai (TH); Taywin Channo, Lampang (TH)

(73) Assignee: Foamtec International Co., Ltd., Waco, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/128,880

(22) Filed: Dec. 21, 2020

(65) Prior Publication Data

US 2021/0107039 A1 Apr. 15, 2021

Related U.S. Application Data

(63) Continuation of application No. 15/934,611, filed on Mar. 23, 2018, now Pat. No. 10,919,077.

(60) Provisional application No. 62/475,523, filed on Mar. 23, 2017.

(51) Int. Cl.

| | |
|---|---|
| ***B08B 3/04*** | (2006.01) |
| ***B08B 13/00*** | (2006.01) |
| ***B08B 1/00*** | (2006.01) |
| ***D03D 1/00*** | (2006.01) |
| ***D02G 3/00*** | (2006.01) |

(Continued)

(52) U.S. Cl.

CPC ................ *B08B 3/04* (2013.01); *B08B 1/003* (2013.01); *B08B 13/00* (2013.01); *D02G 3/00* (2013.01); *D03D 1/0023* (2013.01); *D03D 15/292* (2021.01); *D10B 2331/02* (2013.01); *D10B 2331/04* (2013.01); *Y10T 442/30* (2015.04)

(58) Field of Classification Search

None

See application file for complete search history.

(56) References Cited

U.S. PATENT DOCUMENTS 4,888,229 A 12/1989 Paley
4,923,454 A 5/1990 Seymour et al.
(Continued)

FOREIGN PATENT DOCUMENTS

CN 101218388 A 7/2008
CN 102517884 A 6/2012
(Continued)

OTHER PUBLICATIONS

Machine translation of KR100908217 (Year: 2009).*
(Continued)

*Primary Examiner* — Shawn Mckinnon
(74) *Attorney, Agent, or Firm* — Zeman-Mullen & Ford, LLP

(57) ABSTRACT

A pre-saturated wiper for use in a cleanroom environment, or other similarly controlled environment, that includes a woven fabric which incorporates a unique weave pattern with sealed edges that is saturated with only Ultrapure water (UPW).

17 Claims, 4 Drawing Sheets

(51) Int. Cl.

| | |
|---|---|
| ***D03D 15/47*** | (2021.01) |
| ***D03D 15/292*** | (2021.01) |

(56) References Cited

U.S. PATENT DOCUMENTS

| | | | |
|---|---|---|---|
| 2005/0031828 | A1 | 2/2005 | Yoshida |
| 2007/0010148 | A1 | 1/2007 | Shaffer et al. |

FOREIGN PATENT DOCUMENTS

| | | | | |
|---|---|---|---|---|
| CN | 103409882 | A | | 11/2013 |
| KR | 100908217 | | * | 7/2009 |
| WO | 2012/024505 | A2 | | 2/2012 |

OTHER PUBLICATIONS

Foamtec International, "The VOC Free Cleanroom Wiper", Feb. 15, 2017 (Feb. 15, 2017), retrieved on May 16, 2018 https:/www.foamtecintlwee.com/products/presaturated-cleanroom-microfiber-wipes/mirasat-wipers.
Foamtec International-2, "MiraWipe Wipers" Aug. 11, 2012 (Aug. 11, 2012) retrieved on May 16, 2018 from https://web.archive.org/web/20120811053620/https://www.foamtecintlwcc.com/documents/datasheets/pdf/mirawipe-wipers.pdf; entire document, especially p. 1 para 1.
Wikipedia, "Finishing(textiles)", Aug. 4, 2016 (Aug. 4, 2016); entire document especiallly p. 5 para 5.

* cited by examiner

CLEANROOM WIPER AND METHOD FOR MAKING SAME

CROSS-REFERENCE TO RELATED APPLICATIONS

This application is a continuation of and claims benefit of priority to U.S. Nonprovisional patent application Ser. No. 15/934,611 filed Mar. 23, 2018, currently pending, which claims priority to provisional patent application having Ser. No. 62/475,523, filed Mar. 23, 2017, which are herein incorporated by reference in their entireties.

FIELD OF INVENTION

The present invention is generally directed to a pre-saturated wiper for use in a cleanroom environment, or other similarly controlled environment, that enables effective removal of contaminants from equipment and work surfaces without the use of volatile organic compounds (VOCs) while exhibiting low releasable particle levels. The pre-saturated wiper is made from a woven fabric which incorporates a unique weave pattern with sealed edges that is saturated with only Ultrapure water (UPW). The pre-saturated wiper holds enough UPW to remove contaminants from a surface without leaving the surface wet. Critical surfaces are left clean and dry without VOC use and the health and safety risks that go with it.

BACKGROUND OF THE INVENTION

Currently, pre-saturated wipers using 100% isopropyl alcohol (IPA) as the wetting agent are typically used to clean the critical surfaces within cleanrooms, such as workstations, benchtops, and tooling surfaces like the interior of process chambers. Prior to the use of pre-saturated wipers, dry wipers were used in conjunction with squirt bottles containing IPA. Current users of wipers pre-saturated with IPA believe they offer a more convenient, cost-effective approach to contamination control.

Companies using IPA pre-saturated wipers have reported better protocol adherence (likely due to convenience), lower overall wiper usage, lower volatile organic compound (VOC) levels, reduced fire hazards and more reproducible wetting levels on wipers as compared to the use of dry wipers with squirt bottles. Nevertheless, IPA pre-saturated wipers still carry the health and safety risks associated with VOCs such as flammability, fugitive VOC emissions, and personnel exposure to VOCs.

In addition, another drawback to wipers pre-saturated with IPA is that they exhibit significant releasable particle levels, including levels that may be higher than those for corresponding dry wipers. The higher particle levels with IPA pre-saturated wipers have been linked to the long-term contact of the wetting agent with the wipers. These higher particle levels found during the testing of IPA pre-saturated wipers could potentially represent increased levels of particle exposure and risk to environmental surfaces and/or processes.

Accordingly, there is a need for a pre-saturated cleanroom wiper that effectively cleans critical surfaces while providing increased process benefits, reduced costs, and enhanced environmental health and safety over current methods, namely those that use IPA pre-saturated wipers or dry wipers in conjunction with squirt bottles containing IPA.

SUMMARY OF THE INVENTION

The present invention is directed to a pre-saturated microfiber sealed edge wiper that is only pre-saturated with Ultrapure Water (UPW). Ultrapure water (UPW or high purity water) is water that has been purified to uncommonly stringent specifications. Ultrapure water is a commonly used term in the semiconductor industry to emphasize the fact that the water is treated to the highest levels of purity for all contaminant types, including: organic and inorganic compounds, dissolved and particulate matter, volatile and non-volatile, reactive and inert, hydrophilic and hydrophobic, and dissolved gases. The wiper of the present invention enables cleanroom technicians to achieve 100% VOC free wiping and completely eliminates flammable solvents including IPA form cleanroom wiping procedures. The wiper of the present invention is constructed from a microfiber fabric with a unique woven pattern that allows operators to dislodge, entrap, and remove contaminants while leaving surfaces clean and dry using only UPW. The weave and sealed edge of the wiper provide resistance to abrasion and tearing in order to reduce in-use particle and fiber generation.

The UPW pre-saturated wiper of the present invention can be used in ISO Class 3 and higher cleanrooms. The UPW pre-saturated wiper is particularly useful in cleaning hi-vac process chambers and robotics in flat panel display and water fabs, cleaning volatile organic compound (VOC) sensitive process equipment in lithography, chemical vapor deposition, and metrology modules, and cleaning baked on resist ad developer from lithography tracks. The UPW pre-saturated wiper can also be used in the final wipe down of sensitive components such as equipment front end modules, electrostatic chucks, VAT valves, and gas dispersion plates. The UPW pre-saturated wiper is also particularly useful during the preventive maintenance of equipment and in wetcleans where the elimination of VOCs and flammable solvents are required. Horizontal surfaces, stainless steel carts, and work surfaces in the cleanroom are also ideal places to use the UPW pre-saturated wiper of the present invention.

In one exemplary embodiment, the cleanroom wiper of the present invention includes a woven fabric having at least two distinct microfibers wherein the woven fabric is pre-saturated with only ultrapure water. In one aspect of the invention, one of the microfibers that make up the woven fabric may comprise a nylon/polyester conjugate. Further, the nylon/polyester conjugate may be made of 25-30% nylon and 70-75% polyester. In one particular exemplary embodiment, the nylon/polyester conjugate may comprise 72% polyester and 28% nylon which has proven to hold enough water to wet the surface to be cleaned so that contaminants can be removed without leaving the surface wet, which could inhibit tool recovery.

In another aspect of the invention, the woven fabric may have sealed edges. In yet another aspect of the invention, the woven fabric may include a first microfiber and a second microfiber that are woven using a repeating pattern having six warp threads and eighteen weft threads. The first microfiber material may be a nylon/polyester conjugate that is used for the eighteen weft threads in the repeating pattern. The second microfiber material may be a polyester that is used for the six warp threads in the repeating pattern. The weave pattern allows for immediate and even saturation of the wipers with UPW. Multiple UPW pre-saturated wipers of the present invention may be stacked within packaging containing the wipers and the top and bottom wipers contained within the package contain the same amount of water and are therefore evenly wetted with UPW.

The present invention is also directed to a method for making a UPW pre-saturated wiper that includes the steps of selecting microfibers with one microfiber comprising a nylon/polyester conjugate, weaving the microfibers using a special weave pattern to create a roll of woven fabric, processing the woven fabric for fast water wet out using high temperature, high pressure, and agents, clean processing the processed woven fabric with aseptic ultra pure water, forming wipers form the processed roll of fabric by cutting and sealing the fabric, and packaging and pre-saturating with ultra pure water. The method may also include the steps of post processing with gamma irradiation to assure sterility and lot testing to certify cleanliness.

Another exemplary embodiment of the method for making a UPW pre-saturated wiper includes the steps of 1) weaving at least two distinct microfiber materials to create a woven fabric where one of the microfiber materials is a nylon/polymer conjugate, 2) processing the woven fabric with high temperature, high pressure, and at least one surfactant, 3) cleaning the woven fabric with aseptic pure water, 4) drying the woven fabric, 5) cutting the woven fabric and sealing the edges of the woven fabric to create individual wipers, and 6) packaging and pre-saturating the wipers with only ultra pure water. The weaving step may include weaving the nylon/polymer conjugate material with a second microfiber material using a repeating pattern having six warp threads and eighteen weft threads. The nylon/polymer conjugate material may be used for the eighteen weft threads in the repeating pattern and the second microfiber material may be used for the six warp threads in the repeating pattern.

The woven fibers of the woven fabric may be relaxed before the step of processing the woven fabric. The step of cleaning the woven fabric may include washing the woven fabric with a detergent followed by repeating rinsing of the woven fabric with aseptic pure water. The cutting and sealing of the edges of the woven fabric may be done simultaneously to create individual wipers. The method for making the UPW pre-saturated wiper of the present invention may also include the step of sterilizing the packaged pre-saturated wipers.

DESCRIPTION OF EXEMPLARY EMBODIMENTS

Currently used cleanroom wipers pre-saturated with LPA are comprised of polyester. Polyester wipers need to fully wet a surface to be cleaned in order to get any kind of cleaning efficiency. One hundred percent polyester fabrics do not leave surfaces dry. Leaving a cleaned surface in a cleanroom wet with IPA is not a concern because all of the IPA will quickly evaporate. However, the downside to using IPA is that the IPA fumes are hazardous, flammable, and a source of pollution. In addition, 100% polyester easily sheds particles due to its lower resistance to abrasion.

Despite the issues and drawbacks associated with IPA pre-saturated polyester wipers, semiconductor fabrication plants would never consider using water with wipers because many tools in the semiconductor manufacturing process must operate at $10^4$ to $10^7$ atmospheres and leaving water in the tool will extend pump down times by three to five times or by many hours. Plants will not allow these pump down times because the tools are valued at over $10,000 dollars/hr. However, if a wiper for use with water could be manufactured such that it would function like a wiper used with IPA, i.e. function so that it cleans but does not leave a cleaned surface wet, then semiconductor fabrication plants may readily elect to use them since they do not possess the safety and health risks associated with IPA.

The present invention is directed to just such a wiper. The present invention includes a pre-saturated wiper that is saturated exclusively with Ultrapure water (UPW) and that is constructed in such a way that the UPW immediately and evenly wets into the wiper and is capable of cleaning critical surfaces without leaving water on the critical surface. The present invention also includes a method for making the UPW pre-saturated wiper of the present invention.

Figure 1:
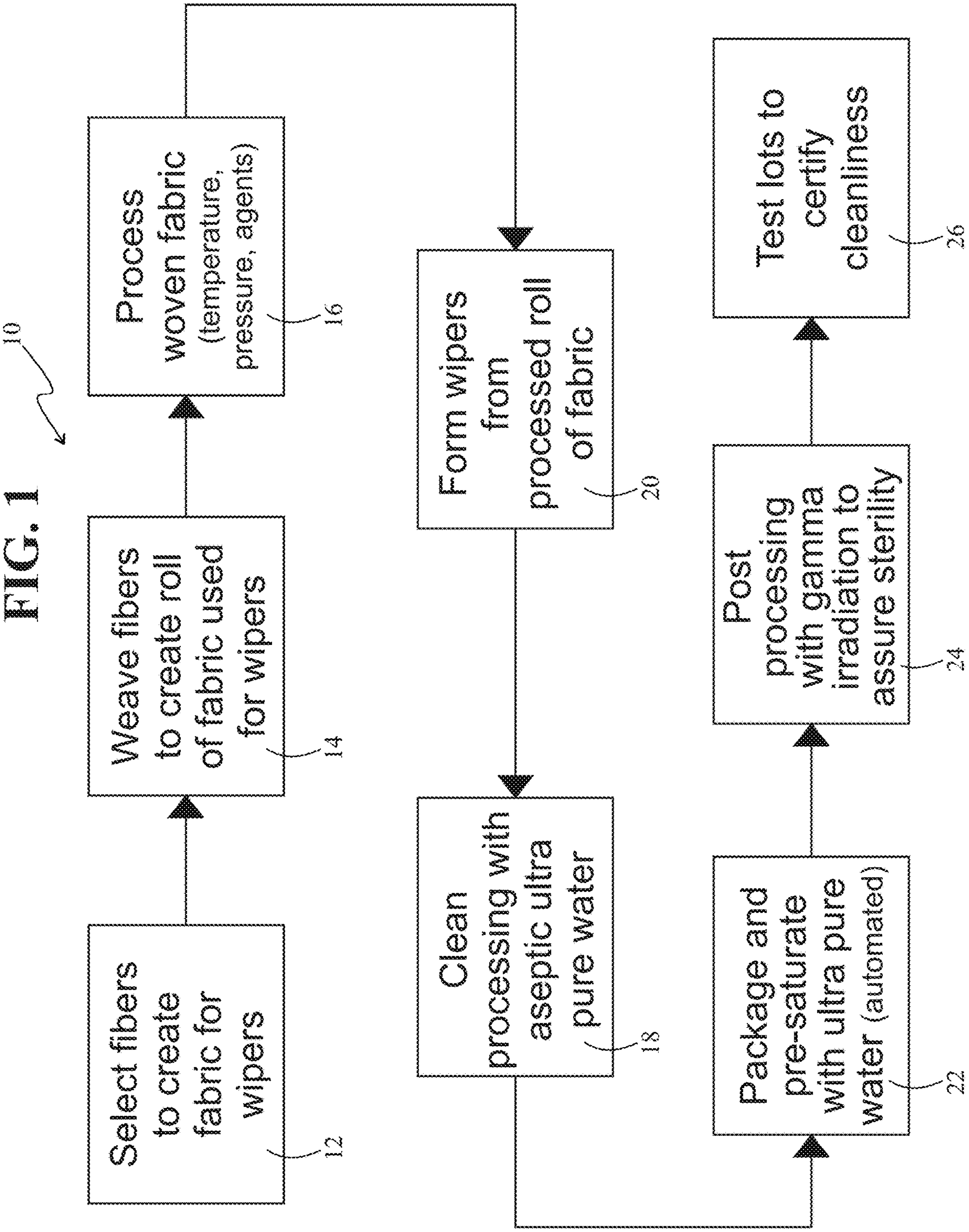
FIG. 1 is a flow chart showing steps in an exemplary method for making the UPW pre-saturated cleanroom wiper of the present invention.
Figure 2:
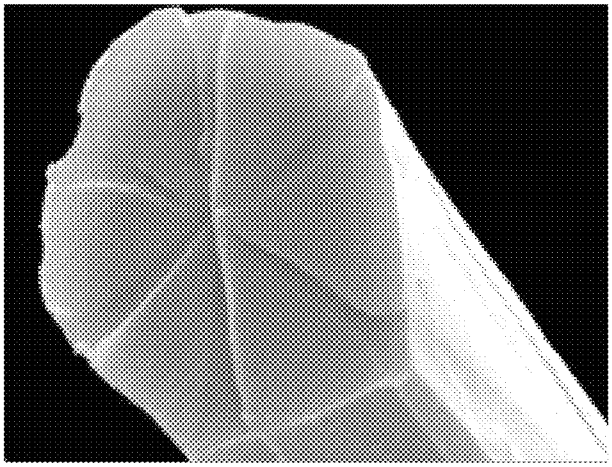
FIG. 2 is a photo of a first microfiber that is used to make the woven fabric that is used to make one exemplary embodiment of the wiper of the present invention.
Figure 3:
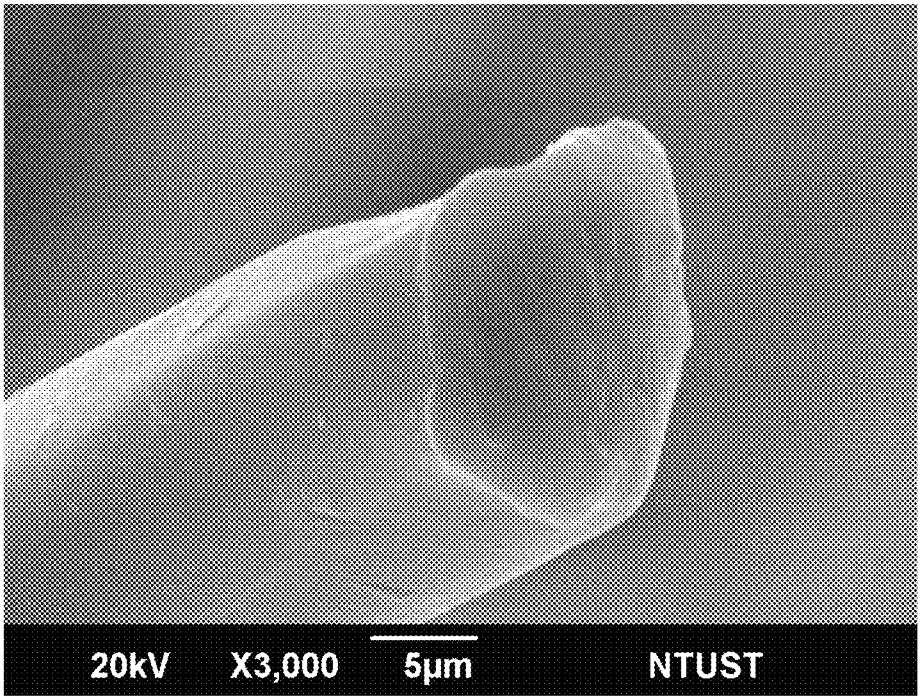
FIG. 3 is a photo of a second microfiber that is used to make the woven fabric that is used to make the exemplary embodiment of the wiper of the present invention referred to in FIG. 2.

FIG. 1 is a flow chart showing steps in an exemplary method 10 for making the UPW pre-saturated cleanroom wiper of the present invention. First, in step 12, fibers are selected for creating a woven fabric that will be used to make the wipers. The fibers include a first microfiber that is a nylon/polyester conjugate and a second fiber that is a polyester. A photo of a first microfiber that can be used to make the woven fabric that is used to make one exemplary embodiment of the wiper of the present invention is shown in FIG. 2. The first microfiber material is soft, shiny, and very bulky. It also provides for excellent moisture penetration and air ventilation. The nylon/polyester conjugate may be made of 25-30% nylon and 70-75% polyester. In one particular exemplary embodiment, the nylon/polyester conjugate may comprise 72% polyester and 28% nylon. A photo of a second microfiber that can be used to make the woven fabric that is used to make the exemplary embodiment of the wiper of the present invention is shown in FIG. 3. The second microfiber material is soft, high density, waterproof, permeable to moisture, and has a high tensile strength.

Figure 5:
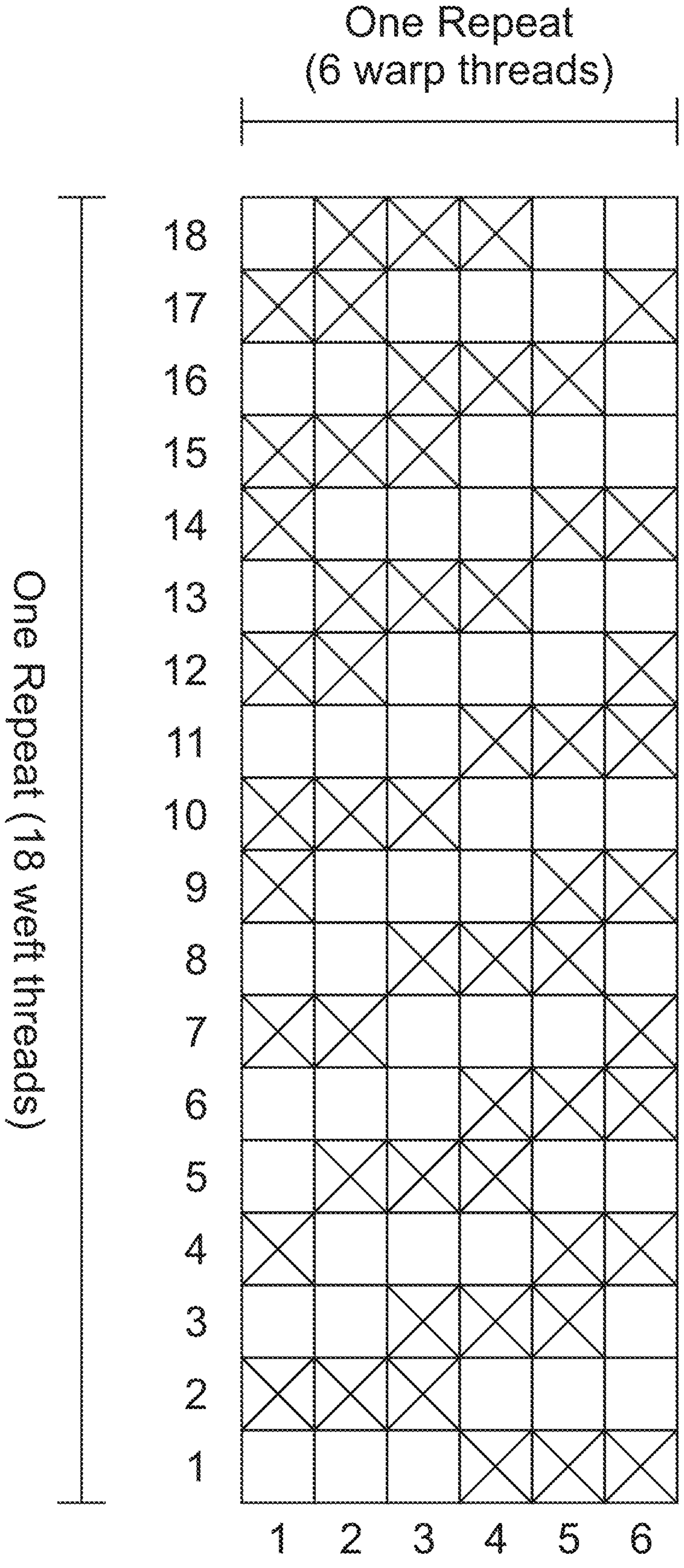
FIG. 5 is a drawing showing the weaving pattern that was used to make the modified woven fabric having fast water wet out shown in FIG. 4.

In step 14, the first and second microfibers are woven using a specific weaving pattern like that shown in FIG. 5 which assists in enabling the woven fabric to be Fast Water Wet Out, meaning that water can immediately and evenly wet into the woven fabric. The weaving pattern shown in FIG. 5 is one repeating unit that includes 6 warp threads and 18 weft threads. Each box shows the interlocking point of the weave. "X" means the warp yarn/microfiber is above the weft yarn/microfiber on this interlocking point. The first microfiber material described above is used as the weft thread and the second microfiber material described above is used as the warp thread. The first and second microfibers are woven to create a roll of woven fabric that is used to make the wipers. In one exemplary method, the rolls of woven fabric may comprise 61-inch-wide rolls of woven fabric.

Figure 4:
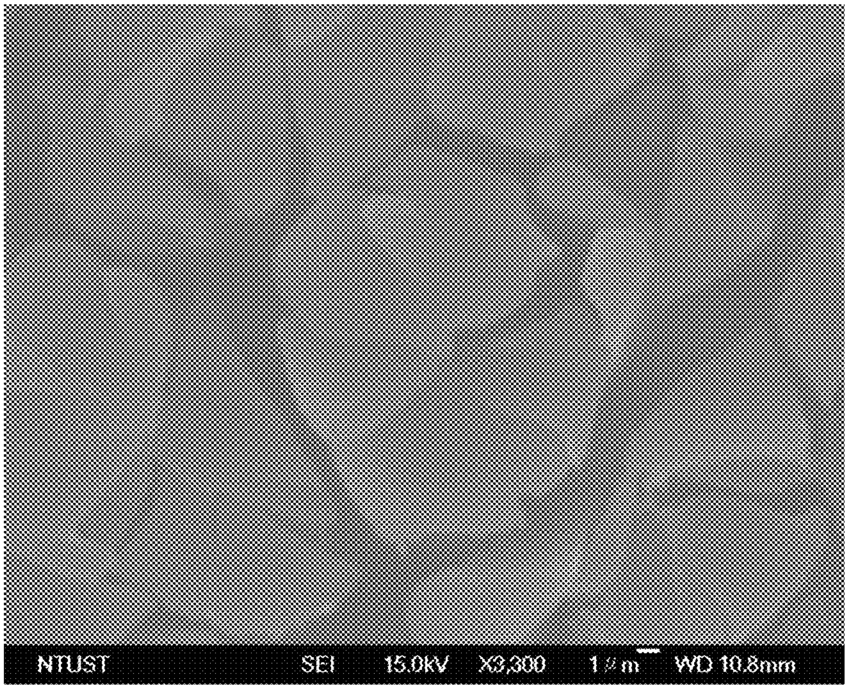
FIG. 4 is a photo of a modified woven fabric having fast water wet out that was made using the microfibers shown in FIGS. 2 and 3.
Figure 6:
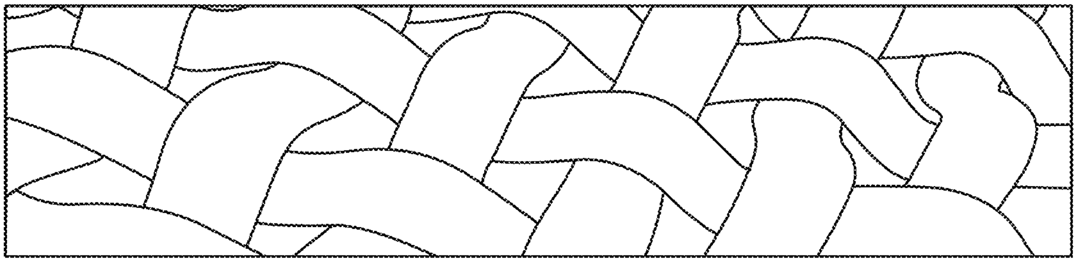
FIG. 6 is a magnified drawing of relaxed fibers that make up the modified woven fabric having fast water wet out shown in FIG. 4.

The woven fabric is processed in step 16 with high temperature and high pressure and one or more agents such as a surfactant that lowers the interfacial tension between UPW and the woven fabric thereby acting as a wetting agent. This processing further assists in enabling the woven fabric to be Fast Water Wet Out. After processing, a special arrangement on the loom used to weave the microfibers into the woven fabric is used to relax the woven fibers as shown in FIG. 6. A resulting starfish type cross section of the Fast Water Wet Out processed woven fabric is shown in FIG. 4.

In step 18, the processed roll of woven fabric is then clean processed with aseptic ultra pure water. More specifically, the roll of processed woven fabric is washed with detergent for 10 minutes and then rinsed for 36 minutes by performing nine rinses for 4 minutes each. Water is extracted from the roll by spinning it for 5 minutes at 300 rpm and then for 5 minutes at 600 rpm. The roll is then dried in the dryer at 85 degrees Celsius for 2 hours.

Wipers are then formed from the roll of processed woven fabric in step 20. The roll of processed woven fabric is further processed into thinner rolls of fabric and finally to sheets. Smaller rolls and sheets of processed woven fabric are simultaneously cut and sealed with an ultrasonic tool that has a PVD coating on top of the stainless steel to minimize metal contamination transferring to the wiper from the tooling. The fabric is cut and sealed along the length to form sealed edges and then it is processed on another machine to be cut and sealed across the web to create an individual wiper.

In step 22, the individual sealed edge wipers are packaged and pre-saturated with UPW. The wipers are flat stacked on top of each other with 10 or 20 wipers per package. Rolling, ironing, and cutting of the roll of processed woven fabric to form wipers is done in a clean room. Packing and pre-saturation of the wipers is also done in a clean room. The packaged pre-saturated wipers are then sterilized using gamma radiation in step 24. Gamma irradiation is a standard sterilization procedure in which gamma irradiators are powered by Cobalt-60 to effectively kill microorganisms throughout the product and its packaging with very little temperature effect and no residues. Finally, lots of packaged, sterilized products are tested in step 26 to certify cleanliness.

The UPW pre-saturated cleanroom wipers of the present invention work like IPA pre-saturated cleanroom wipers without the safety, environmental, and health issues that are associated with IPA. The UPW pre-saturated cleanroom wipers are clean, smooth and capable of effective cleaning without leaving water behind on the cleaned surface. The woven fabric that comprises the pre-saturated wipers is designed so that the cleaning surface dries very quickly, as it does with IPA pre-saturated wipers.

Process benefits from using the UPW pre-saturated cleanroom wipers of the present invention include, but are not limited to, 1) protecting VOC sensitive fab modules such as lithography, metrology, and CVD from solvent fumes, 2) reducing the risk of fiber and particle excursions associated with fab wipers, 3) improved contamination pickup leading to faster preventative maintenance and improved equipment uptime, 4) even, consistent wetting of wipers which enables excellent first pass cleaning results and reduced cleaning time, and 5) a wiper optimized for use in the most advanced wafer fabs. In addition, using the UPW pre-saturated cleanroom wipers of the present invention enables reduced cost of ownership by reducing wiper usage resulting in a reduction of waste removal cost, greatly reducing VOC process exposure and fugitive emissions costs by eliminating IPA wipes, reducing the cost of Test Wafers by improving $1^{th}$ Pass quality, reducing costs associated with tool downtime by improving particle control, and reducing mean time to clean.

Environmental health and safety benefits experienced with the use of the UPW pre-saturated cleanroom wipers of the present invention include, but are not limited to, 1) eliminating fire risk during cleanroom wipe downs by reducing flammable chemical storage and solvent squirt bottles, 2) eliminating fugitive VOC emissions and air permit implications associated with solvent wiping, and 3) eliminating personnel exposure to isopropyl alcohol during cleanroom wipe downs.

Initial evaluations of performance and contamination characteristics of the UPW pre-saturated cleanroom wipers of the present invention show improvements over existing IPA pre-saturated wipers. Some initial data showing these characteristics for the UPW pre-saturated cleanroom wipers of the present invention are set forth in Table 1 below. The data in Table 1 represents typical analyses of the wipers after seven days of saturation (in dry state). The unit of measurement refers to the standard unit used in standard test methodEST-RP-C004.3.

TABLE 1

| Property | Typical Value |
|---|---|
| Performance Characteristics | |
| Basis Weight | 160 $g/m^2$ |
| Absorbency | |
| Sorptive Capacity | 330 $mL/m^2$ |
| Sorptive Rate | 0.5 seconds |
| Contamination Characteristics | |
| LPC ≥ 0.5 μm | 700 $particles/cm^2$ |
| Fibers ≥ 100 μm | 250 $fibers/m^2$ |
| Non-Volatile Residue | |
| IPA extractant | 0.15 $g/m^2$ |
| DI Water extractant | 0.05 $g/m^2$ |
| Ions | |
| Chloride | 0.10 ppm |
| Sodium | 0.20 ppm |
| Potassium | 0.20 ppm |
| Organic with FTIR | |
| Silicone | Not detected |
| Amide | Not detected |
| DOP | Not detected |
| VOC | 0 ppb |

The drawings and description of exemplary embodiments of the invention herein shows various exemplary embodiments of the invention. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those reasonably skilled in the art. Additionally, all included examples are non-limiting .illustrations of the exemplary embodiments and modes, which similarly avail themselves to any equivalent modes or embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If any other special meaning is intended for any word or phrase, the specification will clearly state and define the special meaning.

The invention claimed is:

1. A cleanroom wiper comprising a woven fabric having a first microfiber material comprising a nylon/polyester conjugate comprising 25-30% nylon and 70-75% polyester and a second microfiber material comprising a polyester wherein the first and second microfiber materials are woven using a repeating pattern having six warp threads and eighteen weft threads and the woven fabric is pre-saturated with only ultrapure water which immediately and evenly wets into the wiper.

2. The cleanroom wiper of claim I wherein the woven fabric comprises sealed edges.

3. The cleanroom wiper of claim 1 wherein the wiper has an absorptive capacity of greater than 300 $mL/m^2$ and an absorptive rate of less than 0.6 seconds.

4. A cleanroom wiper comprising a woven fabric having a first microfiber material and a second microfiber material where the first and second microfiber materials are woven using a repeating pattern having six warp threads and eighteen weft threads wherein the woven fabric is pre-saturated with only ultrapure water which immediately and evenly wets into the wiper.

5. The cleanroom wiper of claim 4 wherein the first microfiber material comprises a nylon/polyester conjugate.

6. The cleanroom wiper of claim 5 wherein a second microfiber material comprises a polyester.

7. The cleanroom wiper of claim 4 wherein the woven fabric comprises sealed edges.

8. The cleanroom wiper of claim 1 made by a method comprising the steps of:

weaving said first and second microfiber materials in a repeating pattern having six warp threads and eighteen weft threads to create the woven fabric;

processing the woven fabric with high temperature, high pressure, and at least one surfactant;

cleaning the woven fabric with aseptic ultra pure water;

drying the woven fabric;

cutting the woven fabric and sealing the edges of the woven fabric to create individual wipers; and packaging and pre-saturating the wipers with the ultra pure water.

9. The cleanroom wiper of claim 8 wherein the woven fibers of the woven fabric are relaxed before the step of processing the woven fabric.

10. The cleanroom wiper of claim 9 wherein the step of cleaning the woven fabric comprises washing the woven fabric with a detergent followed by repeated rinsing of the woven fabric with aseptic pure water.

11. The cleanroom wiper of claim 10 wherein the step of cutting and sealing the edges of the woven fabric comprises simultaneous cutting and sealing.

12. The cleanroom wiper of claim 8 further comprising the step of sterilizing the packaged pre-saturated wipers.

13. A method for making a pre-saturated cleanroom wiper saturated with only ultra pure water comprising the steps of:

weaving a first microfiber material comprising a nylon/polyester conjugate comprising 25-30% nylon and 70-95% polyester and a second microfiber material comprising a polyester to create a woven fabric wherein the step of weaving comprises weaving the first and second microfiber materials using a repeating pattern having six warp threads and eighteen weft threads;

processing the woven fabric with high temperature, high pressure, and at least one surfactant;

cleaning the woven fabric with aseptic ultra pure water;

drying the woven fabric;

cutting the woven fabric and sealing the edges of the woven fabric to create individual wipers; and packaging and pre-saturating the wipers with only ultra pure water.

14. The method of claim 13 wherein the step of cleaning the woven fabric comprises washing the woven fabric with a detergent followed by repeated rinsing of the woven fabric with aseptic pure water.

15. The method of claim 13 wherein the step of cutting and sealing the edges of the woven fabric comprises simultaneous cutting and sealing.

16. The method of claim 13 further comprising the step of sterilizing the packaged pre-saturated wipers.

17. The method of claim 13 further comprising the step of relaxing the microfibers of the woven fabric before the step of processing the woven fabric.

* * * * *